(12) United States Patent
Thubert et al.

(10) Patent No.: US 10,524,194 B2
(45) Date of Patent: *Dec. 31, 2019

(54) VIRTUAL ACCESS POINT (VAP) FORMATION

(71) Applicant: Cisco Technology, Inc., San Jose, CA (US)

(72) Inventors: Pascal Thubert, La Colle sur Loup (FR); Jean-Philippe Vasseur, Saint Martin D'uriage (FR); Patrick Wetterwald, Mouans Sartoux (FR); Eric Levy-Abegnoli, Valbonne (FR)

(73) Assignee: Cisco Techology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,108

(22) Filed: Jan. 15, 2019

(65) Prior Publication Data

US 2019/0166547 A1 May 30, 2019

Related U.S. Application Data

(63) Continuation of application No. 15/491,203, filed on Apr. 19, 2017, now Pat. No. 10,225,789.

(Continued)

(51) Int. Cl.
*H04W 24/02* (2009.01)
*H04W 48/14* (2009.01)
(Continued)

(52) U.S. Cl.
CPC ............ *H04W 48/14* (2013.01); *H04L 1/18* (2013.01); *H04W 24/02* (2013.01); *H04W 88/08* (2013.01)

(58) Field of Classification Search
CPC ..................................................... H04W 48/14
See application file for complete search history.

(56) References Cited

U.S. PATENT DOCUMENTS 9,210,534 B1 12/2015 Matthieu et al.
9,405,591 B2 8/2016 Bhanage et al.
(Continued)

FOREIGN PATENT DOCUMENTS

EP 2995041 A2 3/2016

OTHER PUBLICATIONS

"LoRa Alliances™ Technology", https://www.lora-alliance.org/What-Is-LoRa/Technology, Accessed Jan. 4, 2017, 2 pages, LoRa Alliance.

(Continued)

*Primary Examiner* — Michael T Vu
(74) *Attorney, Agent, or Firm* — Behmke Innovation Group LLC; James Behmke; Stephen D. LeBarron

(57) ABSTRACT

In one embodiment, a supervisory device in a network receives from a plurality of access points (APs) in the network data regarding a network availability request broadcast by a node seeking to access the network and received by the APs in the plurality. The supervisory device uniquely associates the node with a virtual access point (VAP) for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

18 Claims, 12 Drawing Sheets

Related U.S. Application Data

(60) Provisional application No. 62/415,356, filed on Oct. 31, 2016.

(51) Int. Cl.
  *H04L 1/18* (2006.01)
  *H04W 88/08* (2009.01)

(56) References Cited

U.S. PATENT DOCUMENTS

| | | | |
|---|---|---|---|
| 2006/0165103 A1* | 7/2006 | Trudeau | H04L 12/2854 370/401 |
| 2016/0044513 A1 | 2/2016 | Hamdi et al. | |
| 2016/0044593 A1 | 2/2016 | Anpat et al. | |
| 2016/0072638 A1 | 3/2016 | Amer et al. | |
| 2016/0112917 A1 | 4/2016 | Bharghavan et al. | |
| 2016/0315808 A1 | 10/2016 | Saavedra | |
| 2016/0323151 A1 | 11/2016 | Nahata et al. | |

OTHER PUBLICATIONS

"Virtual Access Point Software for Windows 7", http://www.virtualaccesspoint.com/, Accessed Jan. 4, 2017, 1 page, virtualaccesspoint.com.

"VirtualAPs", ArubaOS—Chapter 5, http://www.arubanetworks.com/techdocs/ArubaOS_61/ArubaOS_61_UG/VirtualAPs.php, Accessed Jan. 4, 2017, Arubanetworks.com.

"What Is a Virtual Access Point?", SonicOS 6.2—Administration Guide, https://documents.software.dell.com/sonicos/6.2/administrationguide/ sonicpoint/configuring-virtual-access-points/sonicpoint-virtual-access-point/sonicpoint-vap-overview/what-is-a-virtual-access-point, 1 page, Aug. 26, 2016, Quest Software Inc.

Home—The Things Network Wiki; https://thethingsnetwork.org/wiki/LoRaWAN/Home; pp. 1-15.

* cited by examiner

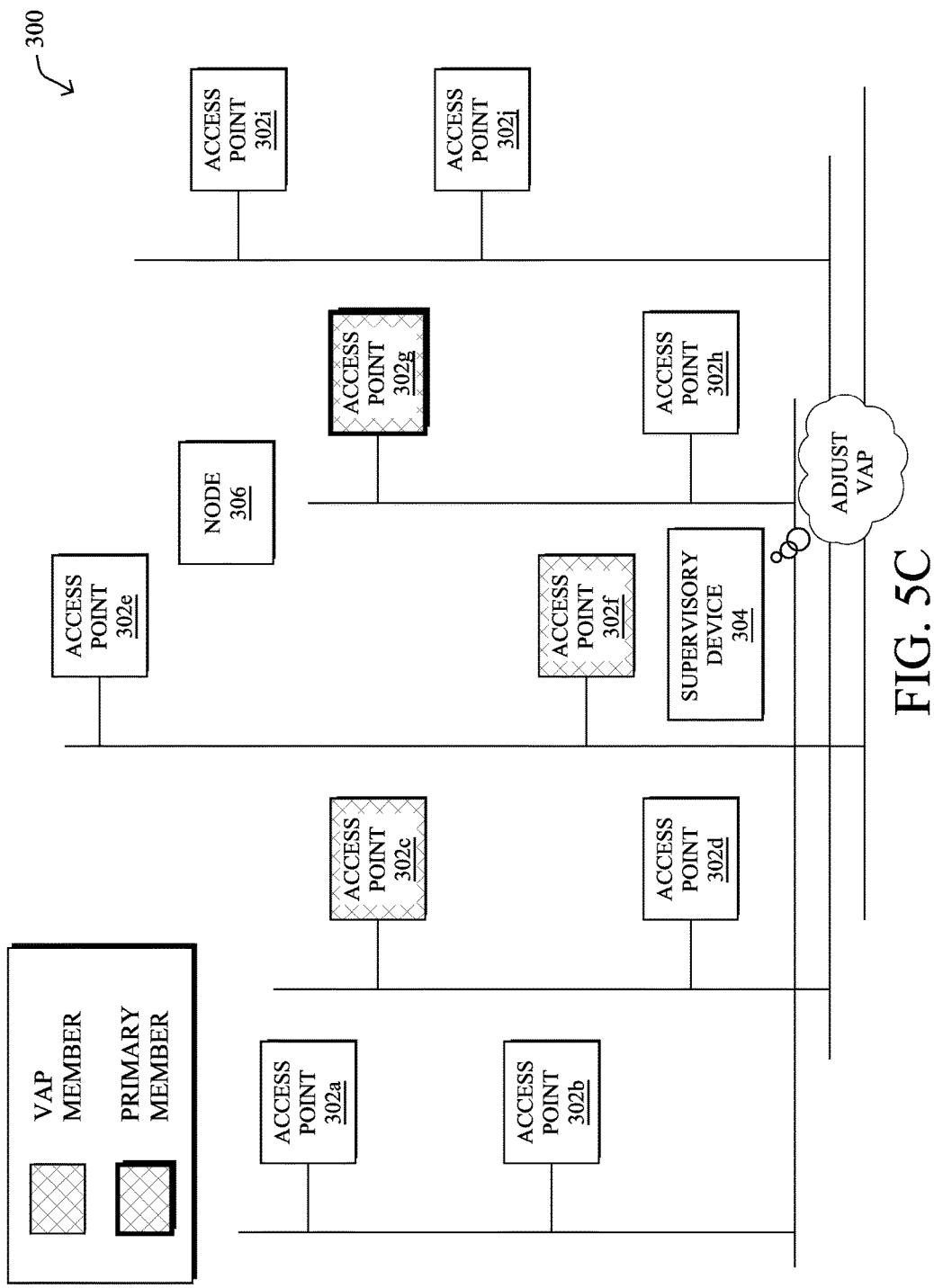

VIRTUAL ACCESS POINT (VAP) FORMATION

RELATED APPLICATION

This application is a Continuation of U.S. patent application Ser. No. 15/491,203, filed on Apr. 19, 2017, which claims priority to U.S. Provisional Patent Appl. No. 62/415,356, filed on Oct. 31, 2016, by Thubert, et al., the contents of which are incorporated herein by reference.

TECHNICAL FIELD

The present disclosure relates generally to computer networks, and, more particularly, to virtual access point (VAP) formation.

BACKGROUND

The Internet of Things (IoT) is the internetworking of devices or objects (a.k.a., "things", e.g., sensors, actuators, nodes, vehicles, etc.) that collect and exchange data, control objects, and process data. Many IoT networks are formed on low-power lossy networks (LLNs), and utilize carrier sense multiple access with collision avoidance (CSMA/CA) techniques. CSMA/CA, notably, is a communication technique that uses carrier sensing, where nodes attempt to avoid collisions by transmitting only when the channel is sensed to be "idle."

In general, deterministic routing concerns ensuring that messages (e.g., packets) definitively arrive at a destination at a specific time or within a specified time range. However, implementing determinism in hub-and-spoke IoT models, particularly with CSMA/CA, faces a litany of drawbacks, such as overwhelming a server with multiple copies of traffic, excessive delay, surges in latency, and unacceptable frame loss.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate an example of adjusting a VAP mapping; and

DESCRIPTION OF EXAMPLE EMBODIMENTS

Overview

Figure 1:
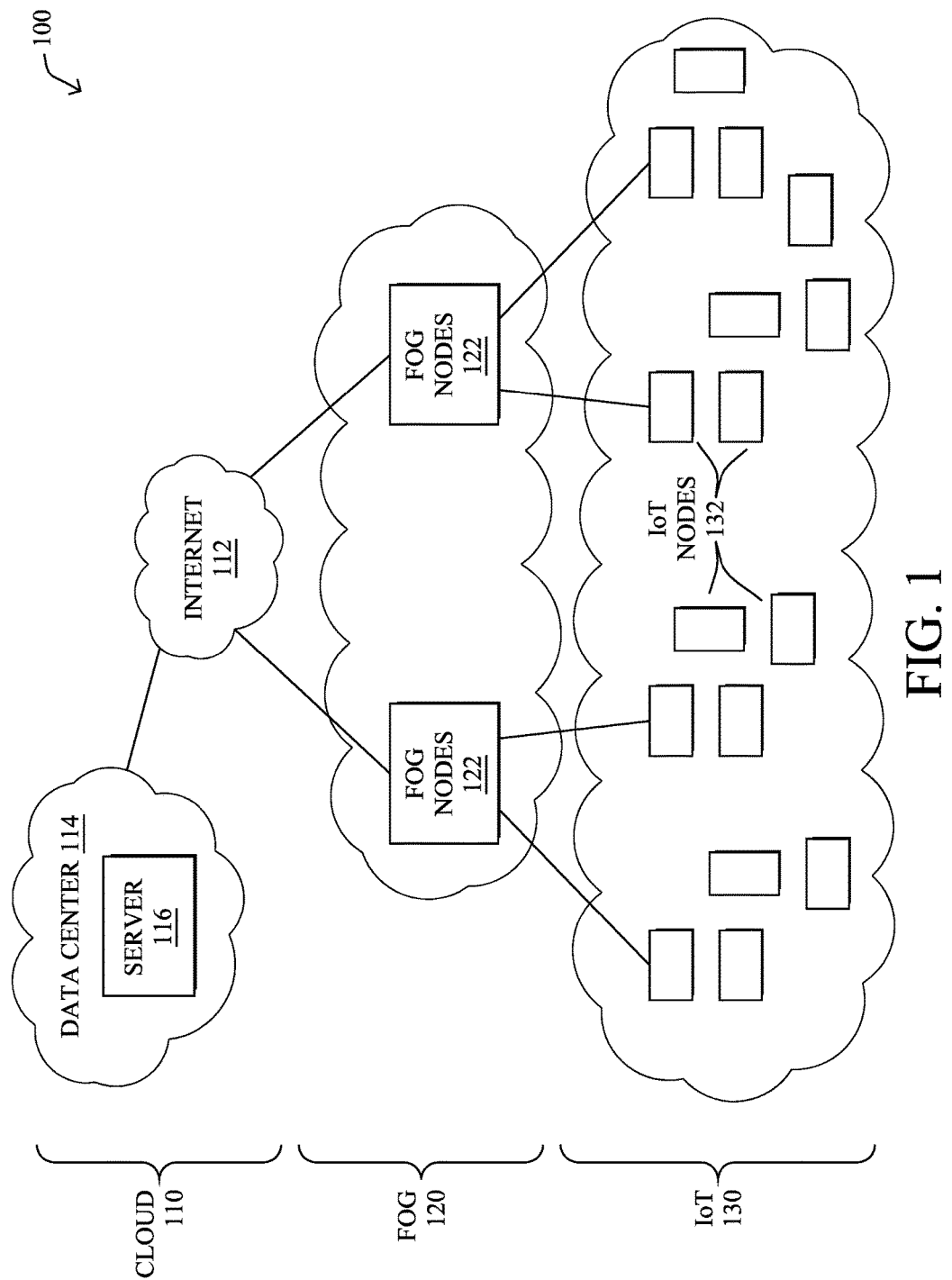
FIG. 1 illustrates an example communication network.

According to one or more embodiments of the disclosure, a supervisory device in a network receives, from a plurality of access points in the network, data regarding a network availability request broadcast by a node seeking to access the network and received by the access points in the plurality. The supervisory device uniquely associates the node with a virtual access point for the node. The supervisory device forms a virtual access point mapping between the virtual access point for the node and a set of the access points in the plurality selected based on the received data regarding the network availability request broadcast by the node. One of the access points in the virtual access point mapping is designated as a primary access point for the node. The supervisory device instructs the primary access point to send a network availability response to the node that includes information for the virtual access point. The node uses the information for the virtual access point to access the network via the set of access points in the virtual access point mapping.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc..), PLC protocols, or other shared-media protocols where appropriate. In this context, a protocol consists of a set of rules defining how the nodes interact with each other.

Figure 2:
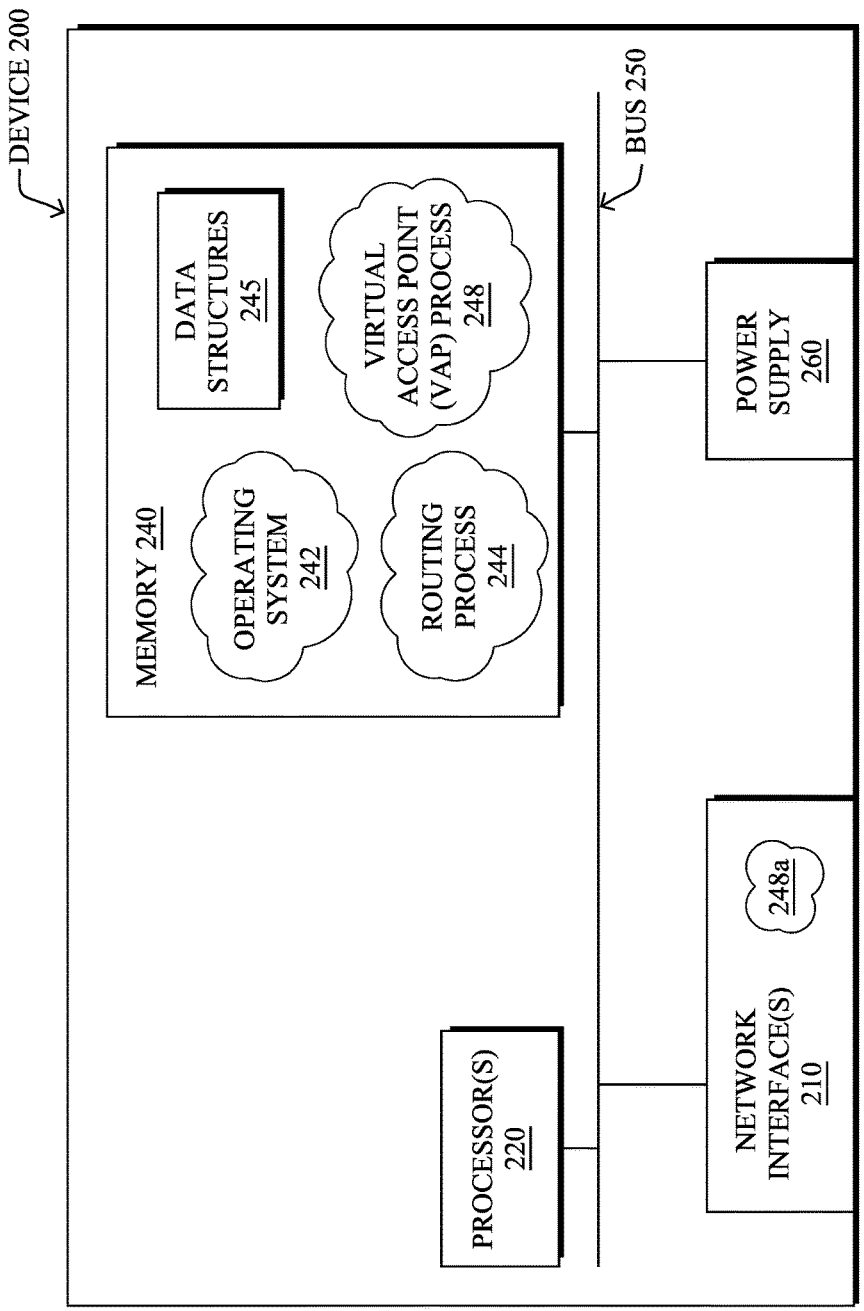
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244 and an illustrative virtual access point (VAP) process 248, as described herein. Note that while VAP process 248 is shown in centralized memory 240, alternative embodiments provide for the process to be specifically operated within the network interfaces 210, such as a component of a MAC layer (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, VAP process 248 includes computer executable instructions that, when executed by processor(s) 220, cause device 200 to perform operations regarding the formation, adjustment, and operation of a VAP within the network. These operations are described in greater detail below. In some embodiments, process 248 may employ any number of machine learning techniques, to perform these operations. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as information regarding the performance/characteristics associated with an established VAP or its underlying APs, to adjust the VAP, accordingly. Often, M is a statistical model, and the cost function is inversely proportional to the likelihood of M, given the input data.

In various embodiments, VAP process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample network data that may be labeled simply as representative of a "good connection" or a "bad connection." On the other end of the spectrum are unsupervised techniques that do not require a training set of labels. Notably, while a supervised learning model may look for previously seen network data that has been labeled accordingly, an unsupervised model may instead look to whether there are sudden changes in the performance of the network and/or the VAP. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly labeled a connection as bad. Conversely, the false negatives of the model may refer to the number of connections that the model labels as 'good,' but are, in fact, of poor quality to the user or endpoint node. True negatives and positives may refer to the number of times the model correctly classifies a connection as good or bad, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the ML predictions, to adjust the underlying model. For example, an indication of a false positive from an expert (e.g., a supervisory system or user) may be used to adjust the underlying model, to avoid such predictive mistakes in the future.

As mentioned above, various protocols have been established for the IoT, including, in particular, various "huband-spoke" models, such as Bluetooth Low Energy, DECT-Ultra Low Energy, IEEE 802.15.4 (with no meshing), and Low Power Wi-Fi. However, there is also a lack of determinism in these models due to prevalent use of carrier sense multiple access with collision avoidance (CSMA/CA) for wireless communications. Notably, deterministic networking requires that the worst-case data loss and latency should be guaranteed in a consistent fashion as multiple services are deployed on a common converged network infrastructure. This determinism is key to many applications, such as safety and process control. To complicate matters further, considering the vast amounts of devices that are currently being installed in various IoT networks, an important constraint to be placed on any solution is that changes at the end device (e.g., IoT device/thing) should not be necessary. This would also enable connection of legacy devices, thereby addressing a much wider market of applicability.

Virtual Access Point (VAP) Formation

The techniques herein introduce a methodology that can be used with existing IoT infrastructure to implement a virtual access point (VAP) that is unique to a given IoT node. In general, the VAP is a logical entity that appears to the endpoint node as a normal AP to which the node associates as normal. In practice, however, the VAP is physically distributed over a number of APs surrounding the device. In another aspect, a supervisory device in the network may control the AP membership in the VAP, such as by transferring AP membership in the network while the node moves and without requiring the node to roam. In further aspects, a machine learning model of the supervisory device may oversee the VAP and adjust the VAP mapping, accordingly. Such a machine learning model may reside in the supervisory device (e.g., controller, cloud service, etc.) in a centralized mode, or in a distributed manner across the APs. Depending on the traffic criticality, more or less of those APs may copy a given frame received from the endpoint node to the supervisory device.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, according to one or more embodiments of the disclosure, a supervisory device in a network receives from a plurality of APs in the network data regarding a network availability request broadcast by a node seeking to access the network and received by the APs in the plurality. The supervisory device uniquely associates the node with a VAP for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

Operationally, the techniques herein specify an architecture and protocol between a supervisory device in a network (e.g., a controller, such as a network server) and a plurality of network access points (APs). The supervisory device may be configured for use with any of the technologies, noted above. Note that the techniques herein illustratively place a number of functions in the supervisory device, such as components hosting Machine Learning (ML) processes, also referred to as "learning machines") that are mostly technology-independent. In some embodiments, these processes may be implemented in a distributed manner (e.g., across different APs), in which case the collective set of APs may be viewed as the supervisory device.

More specifically, the techniques herein enable the formation and use of a VAP that appears to always be "near" an endpoint node, so that quality of transmission and PHY speed can be maintained. A VAP may be instantiated within a set of APs around the node, and the set may vary automatically under the control of the supervisory device (e.g., a controller hosting a machine learning model) within the infrastructure. Thus, the device never needs to make a decision of roaming, which is a paradigm change in Wi-Fi and other wireless networks. Also, since multiple APs can receive a same packet at a same time with unrelated probabilities, the overall chances of reception are increased and delays related to retries are reduced, thus helping with determinism.

Generally, a VAP may include any number of physical APs in the network that are placed in groups of equivalence, all using the same channel and security settings. When a node (e.g., a STA) associates with the network, the supervisory device (e.g., controller) may select a set of APs that together form a VAP for the associated node. The set may be changed as the node moves. In this way, the endpoint node may experience a constant service from the network and does not roam. For joining, the node may interact with one of the APs (e.g., a primary networking AP) and may use a unique network identifier associated with the VAP, such as a unique service set identifier (SSID), a PAN-ID, or the like, that the node uses to access the network. The supervisory device may also optimize the set of APs based on an objective function and on the observed traffic in the network. Diversity is obtained because multiple members of the VAP may receive the same packet from the node, with relatively independent chances of success.

The illustrative VAP protocol described herein also integrates well with deterministic networking (DetNet). In particular, the VAP protocol enables multiple APs to receive a packet from an endpoint node at the same time, creating a natural replication mechanism in which multiple copies of a same packet may be captured, each by a different AP participating in the VAP assigned to the node. Those APs may be connected over different networks and the packet may circulate to the router or the final destination over segregated paths. DetNet elimination may then be used to eliminate duplicate copies, if any. The VAP protocol herein also leverages various networking techniques (e.g., Wi-Fi, controllers, ML processes, etc.), to improve the user experience while maintaining compatibility with the existing network standards and existing endpoint nodes, by creating a virtual AP that is always there and always optimized so the node never tries to roam.

Figure 3A:
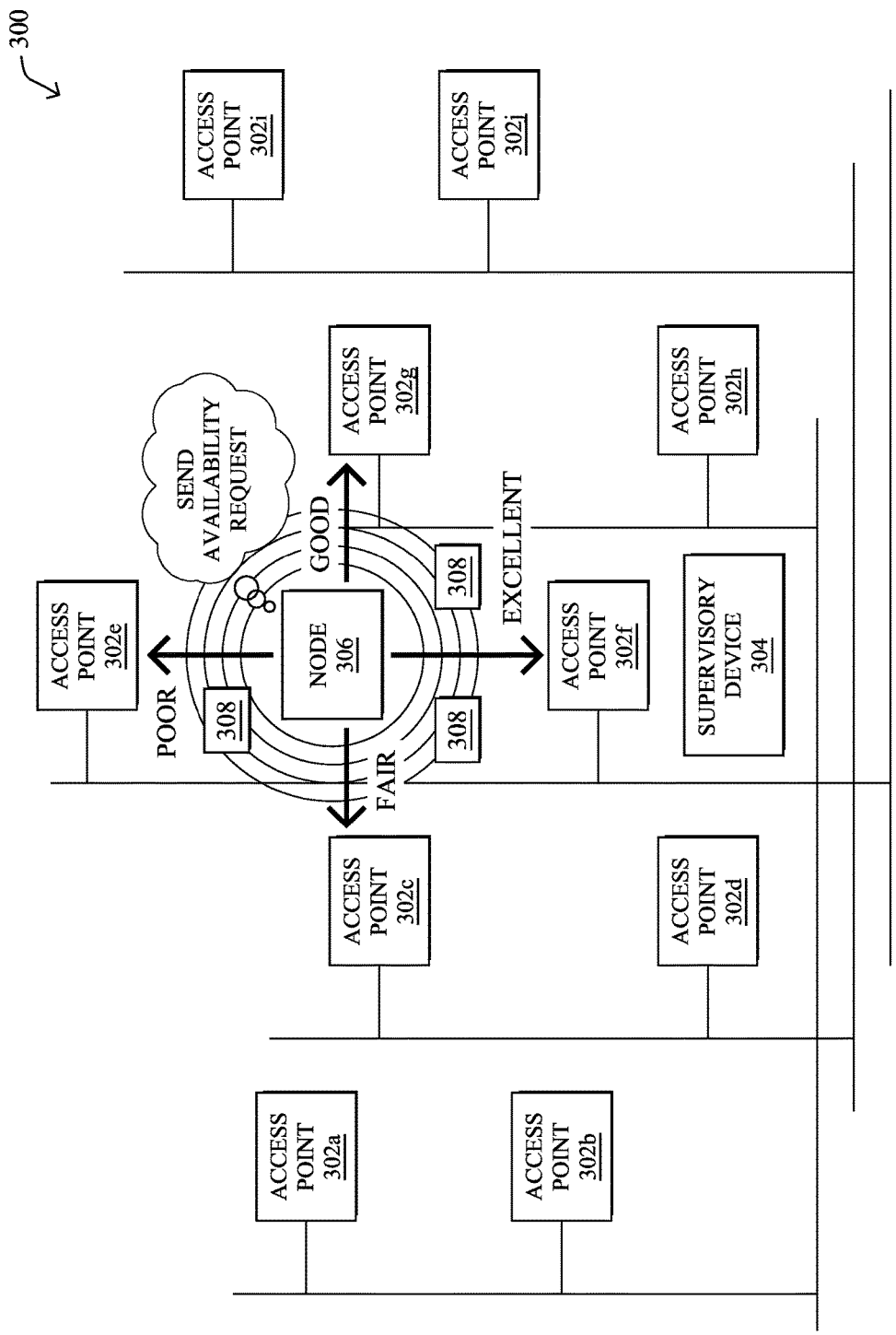
FIGS. 3A-3D illustrate an example of virtual access point (VAP) formation.

FIGS. 3A-3D illustrate an example of virtual access point (VAP) formation, according to various embodiments. As shown in FIG. 3A, assume that there exists a portion 300 of a network that includes a plurality of APs 302 (e.g., APs 302a-302j) that are located in different physical locations through an area (e.g., a building, campus, etc.). APs 302 may be in communication with a supervisory device 304 in the network, such as a wireless controller, other networking device, or, alternatively, a remote device, such as a server located in a data center or cloud computing environment.

Now, assume that a node 306 is attempting to access the network. In such a case, node 306 may broadcast a network availability request 308. The specific format of request 308 may be a function of the specific wireless protocols in use by the network. For example, in the case of 802.11 networks, availability request 308 may be a probe request. As would be appreciated, from the standpoint of node 306, the expected availability response would include an identifier for the available network, such as the SSID of the Wi-Fi network. Reception of availability request 308 by any of APs 302 may trigger the formation of a VAP for node 306, in various embodiments. In further embodiments, a VAP may also be formed at any time after node 306 associates with the network.

In many network implementations, a plurality of APs 302 may receive the broadcast network availability request 308 from node 306, with varying results. Notably, APs 302 within range of node 306 may, by virtue of receiving request 308, capture data regarding request 308, including the contents of request 308 and other characteristics of the received request 308 such as, but not limited to, a link quality indicator (LQI), a signal to noise ratio (SNR), or received signal strength indicator (RSSI), or the like. For example, as shown, AP 302f, which is physically located closest to node 306, may determine that the quality of the received request 308 is "excellent." Similarly, APs 302g, 302c, and 302e may determine that the quality of the received request 308 is "good," "fair," and "poor," respectively.

Figure 3B:
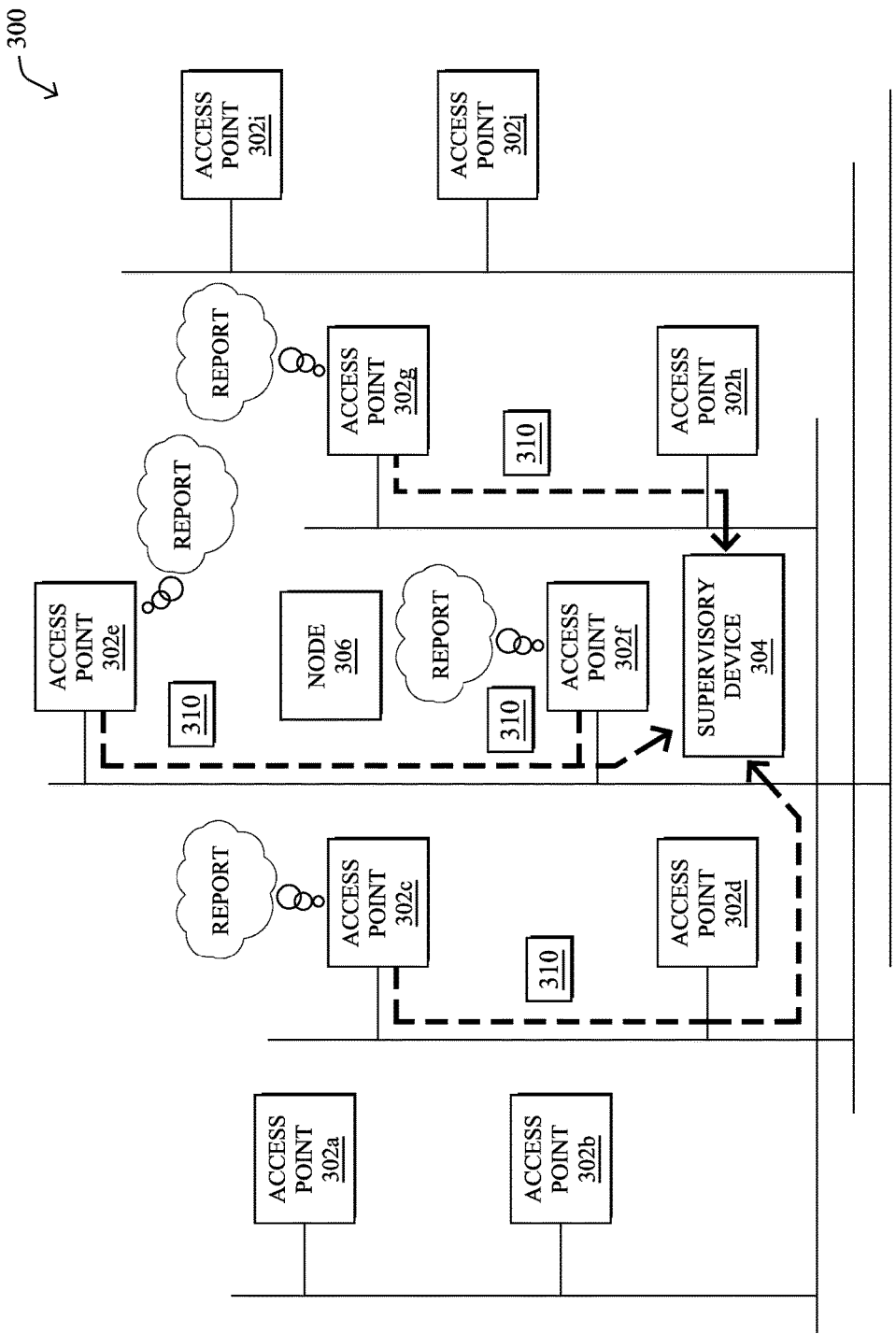

In various embodiments, rather than simply responding to request 308 with the requisite information needed for node 306 to associate with the network, the receiving APs 302 may instead report the captured data regarding request 308 to supervisory device 304. In particular, as shown in FIG. 3B, APs 302c, 302e, 302f, and 302g may send the data 310 regarding the received network availability request 308 from node 306 to supervisory device 304, thereby triggering the formation of a VAP for node 306. Data 310 may include, for example, the identity of the sending AP 302 that received request 308, a MAC address or other networking device identifier for node 306, security status information, and/or at least one metric of the quality of the communication with the node (e.g., signal strength, signal to noise ratio, signal quality, etc.).

Figure 3C:
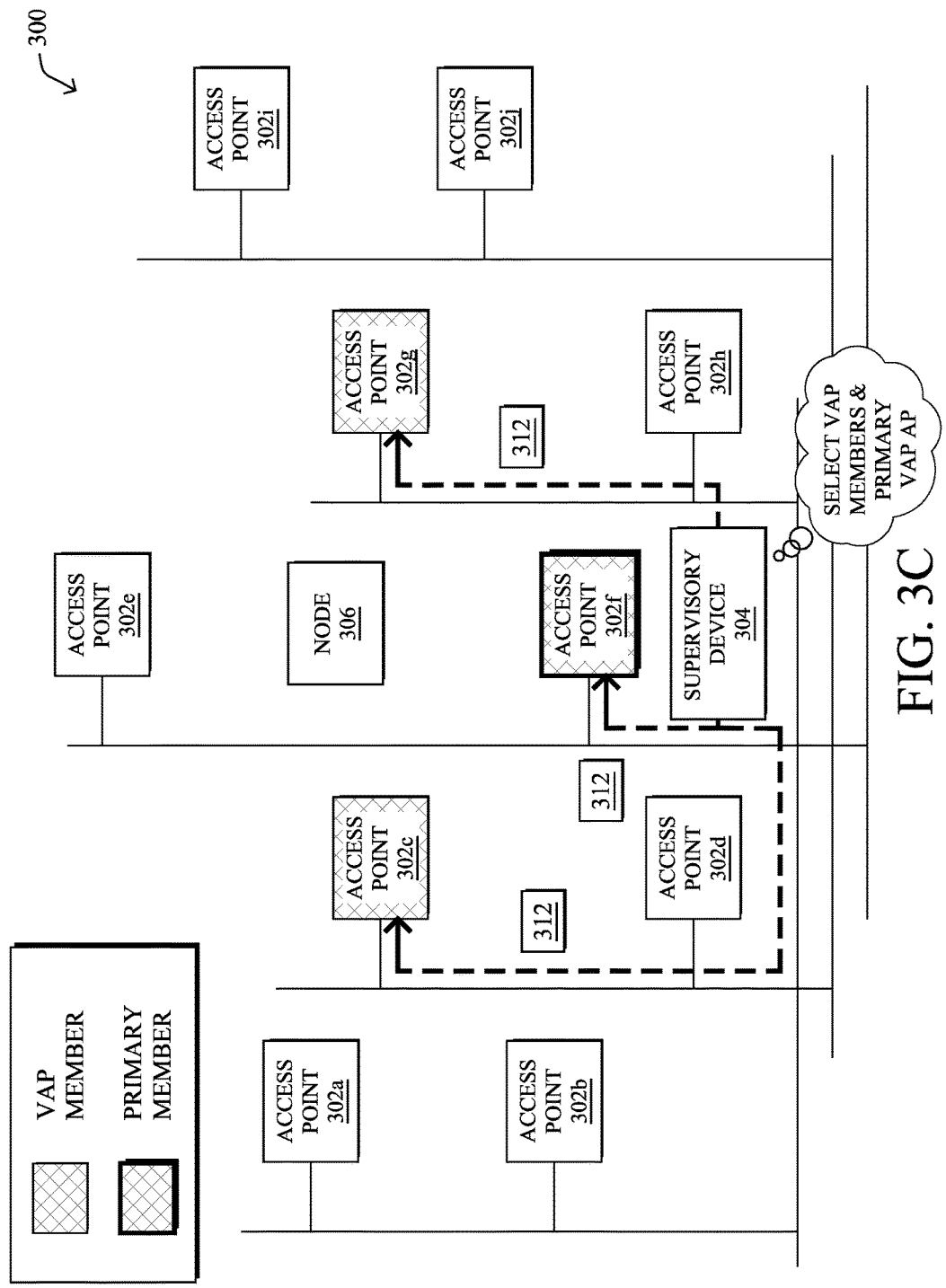

In FIG. 3C, the supervisory device 304 may create a virtual AP (VAP) that is unique to node 306. In general, the VAP may be mapped to any number of APs 306 selected by supervisory device 304 based in part on the data 310 regarding the availability request 308 received by the various APs 302. In other words, the VAP may be a logical construct that is distributed over multiple APs 302. For example, even though APs 302c, 302e, 302f, and 302g received association request 308 from node 306, supervisory device 306 may determine that the set of APs 302 in the VAP mapping for node 306 should only include APs 302c, 302f, and 302g, based on the quality of the received request 308 (e.g., AP 302e may be excluded from the VAP based on the poor quality of the received broadcast signal).

In addition to selecting the VAP member APs 302, supervisory device 304 may also designate one of the selected APs 302 as the primary AP 302 for the VAP. For example, based on data 310 regarding the availability request 308 sent by node 306, supervisory device 304 may determine that AP 302f has the best signal quality and should be the primary AP within the VAP for node 306. In turn, as shown in FIG. 3C, supervisory device 304 may send instructions 312 to the selected APs 302c, 302f, and 302g that include information regarding the VAP. For example, instructions 312 may instruct the selected APs 302c, 302f, and 302g to belong to the VAP for node 306, as identified initially by MAC address of node 306 and, as soon as it is available, by security token, and/or other cryptographic methods.

To implement the VAP in the network, supervisory device 304 may employ a VAP protocol, in order to exchange configuration and data packets with the APs 302. This protocol may be seen as an extension to existing protocols, such as Lightweight Access Point Protocol (LWAPP) and Control and Provisioning of Wireless Access Points (CAP-WAP), or may be specified as a new protocol. For example, the exchanges of data 310 and instructions 312 may use this VAP protocol.

Figure 3D:
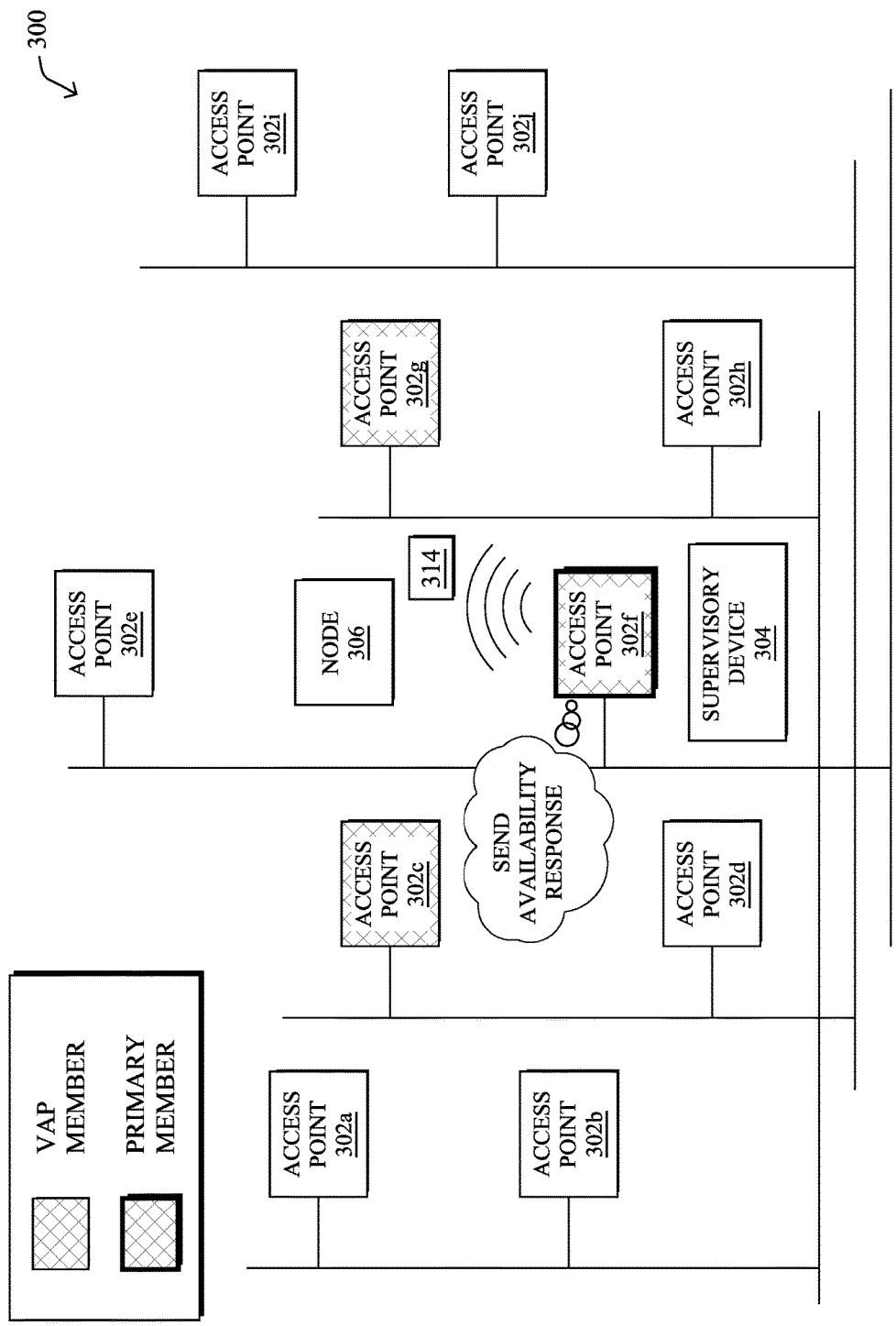

As shown in FIG. 3D, once the VAP has been generated and APs 302c, 302f, and 302g selected for mapping to the VAP, the primary AP 302f may send a network availability response 314 back to node 306. For example, response 314 may be a unicast probe response that has the same information as a beacon frame. In various embodiments, response 314 sent by primary AP 302f to node 306 may also include a unique network identifier associated with the VAP. For example, response 314 may include an SSID or PAN-ID generated by supervisory device 304 specifically for use with the VAP. In turn, node 306 may use the received response 314 to associate with the network, as it would under normal conditions. From the standpoint of node 306, it is associating with the network normally via AP 302f and may remain unaware of the existence of its associated VAP.

Figure 4A:
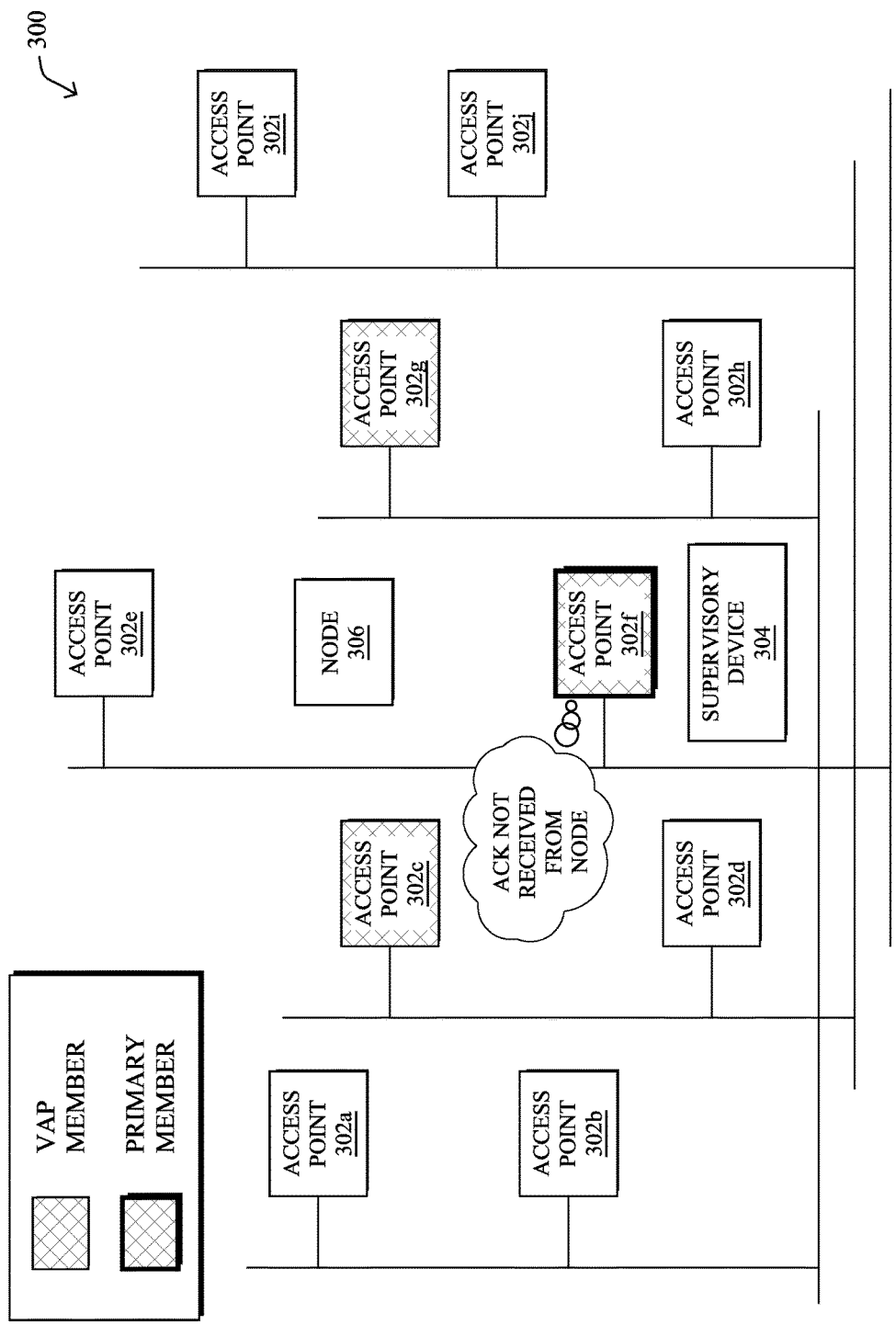
FIGS. 4A-4B illustrate an example of the operation of a VAP.
Figure 4B:
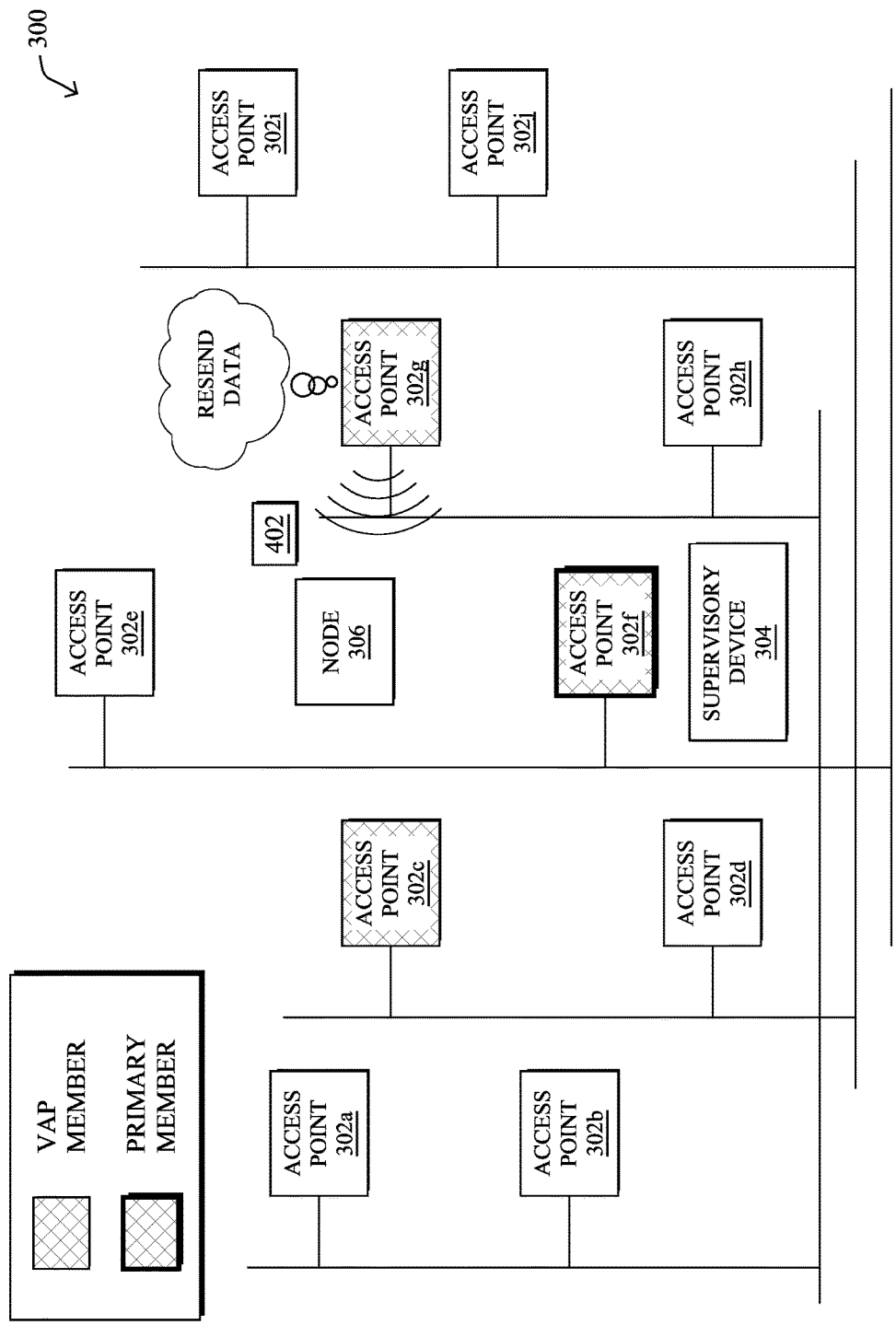

FIGS. 4A-4B illustrate an example of the operation of a VAP after formation, according to various embodiments. Continuing the examples of FIGS. 3A-3D, when forming the VAP for node 306, supervisory device 304 may also build an ordered list of the other APs 302 in the VAP mapping and conveyed to the selected APs 302 via instructions 312. In general, the ordered list may be used to add special diversity and improve the chances of a successful reception versus a retry from a given AP 302 that has already failed once. For example, as shown in FIG. 4A, assume that primary AP 302f has sent a message to node 306, but that message has not been acknowledged by node 306. Under normal circumstances, AP 302f would then attempt to retry sending the message again to node 306. However, according to various embodiments, as shown in FIG. 4B, AP 306g may instead resend the message 402 to node 306. Because the resend is sent from a different AP, the added spatial diversity increases the chances that the resent message 402 is received and acknowledged by node 306.

In various embodiments, learning machines may play a key role in the assignment of APs to a VAP and/or in the adjustment of an existing VAP. For example, such a learning machine may be trained to select APs 302 for inclusion in a given VAP based on a location estimation for the corresponding node (e.g., from data 310) and/or the desired optimization for the traffic expected from that type of node. For example, the location of node 306 may be derived from a Time Difference of Arrival value (TDOA or DTOA) and/or using triangulation between different APs 302.

Such a traffic optimization may be based on a history of traffic for the type of node, in some cases. As would be appreciated, the type of approach taken by the learning machine(s) may also vary with the specific objective function for the traffic and node type. For example, assume that node 306 is a particular type of telepresence device and that video traffic from similar devices has required a certain degree of network performance (e.g., in terms of drops, delay, jitter, etc.). In such a case, the learning machine may use its model for this node type, as well as any necessary metrics from the APs 302 in the network, to select an appropriate VAP mapping to satisfy the objective function. Note that the objective function will also dramatically influence the set of metrics to be gathered from APs after the scanning phase but also during the lifetime of a VAP. Indeed, according to the objective function, the set of required features, in machine learning terms, may vary, and the frequency of AP selection for the VAP will also vary.

Figure 5A:
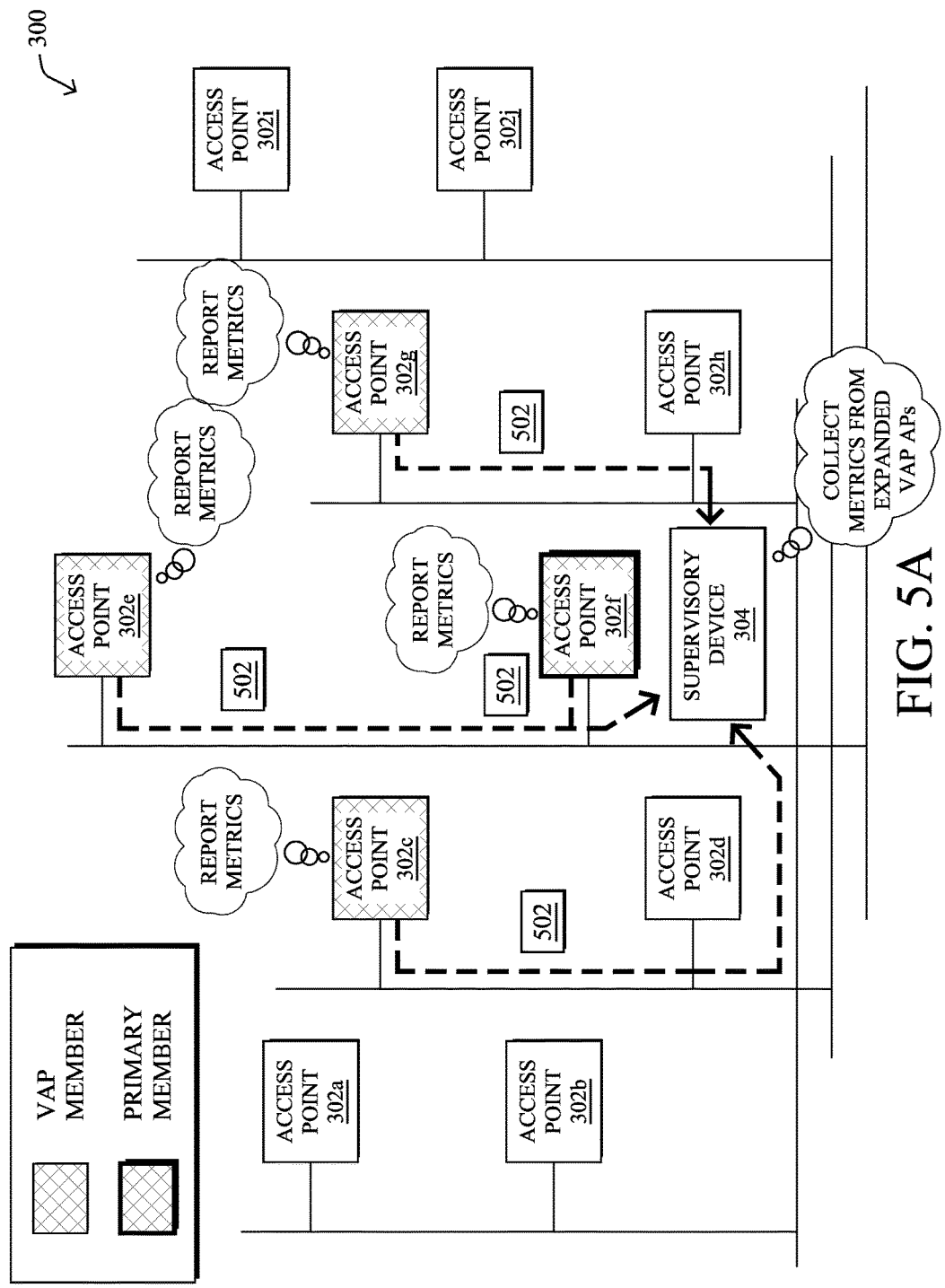
Figure 5B:
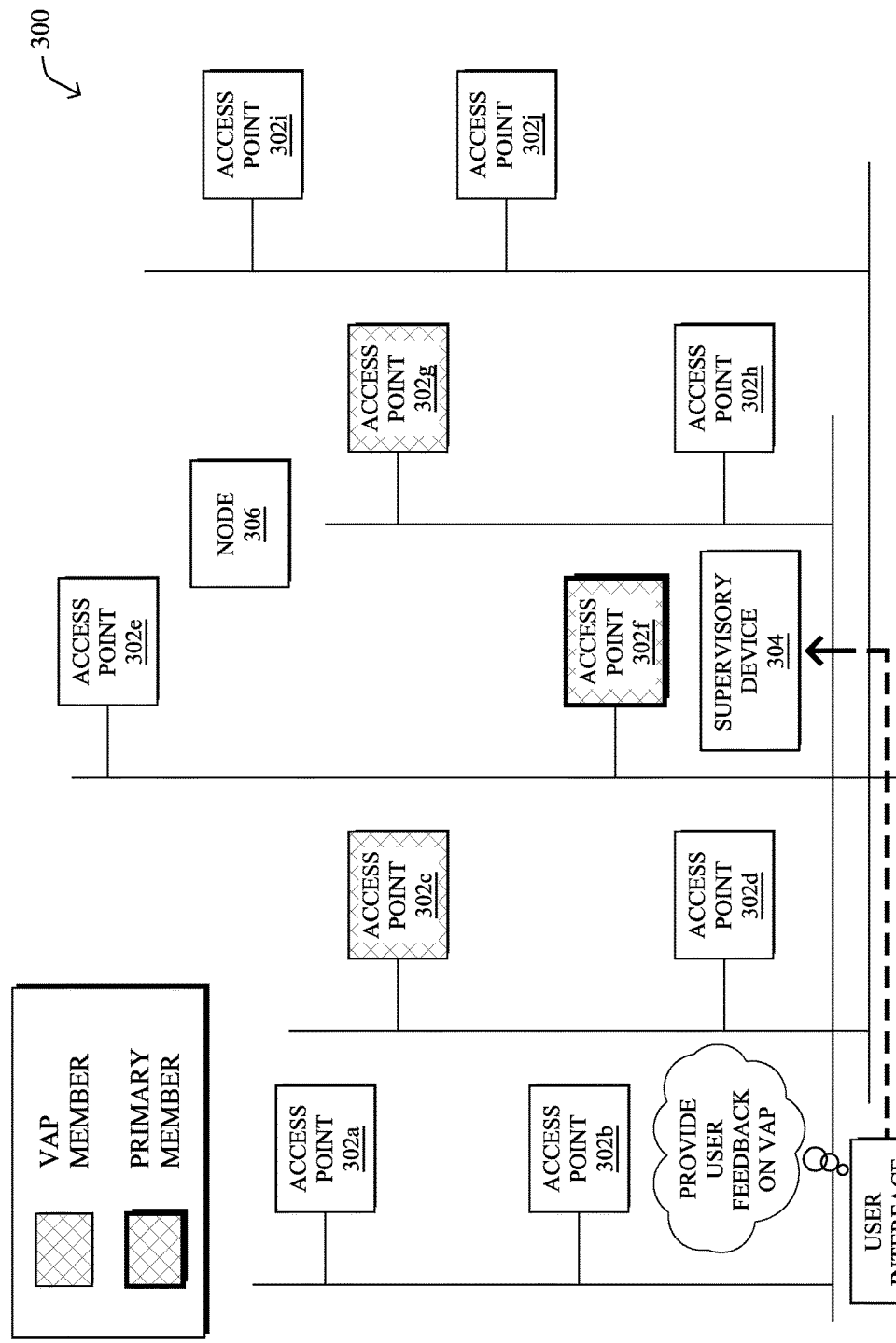

FIGS. 5A-5C illustrate an example of adjusting a VAP mapping, according to various embodiments. Even after formation of a VAP for a given node, supervisory device 304 may continue to monitor and adjust the VAP, in order to ensure that the objective function of the corresponding machine learning model for node 306 continues to be met. To do so, the following message types are introduced herein as part of the VAP protocol:

1.) VAP commands sent by the learning machine to APs 302, to gather metrics of interest (e.g., network characteristics/statistics), report the VAP group membership, etc.

2.) VAP metrics sent by the responding APs 302 to the learning machine and used by the objective function to compute the VAP membership (e.g., based on signal/noise ratio, signal strength, etc.).

3.) VAP stats reports sent by APs 302 to the learning machine and used to evaluate the VAP efficiency. Such stats reports may be used to gather statistical data used by the learning machine to determine the "efficiency" of the VAP group, which can be used by the learning machine to consistently adjust the VAP according to an objective function.

4.) Learning machine stats sent by learning machine to a user interface, to report objective function efficiency results.

In various embodiments, for purposes of collecting network metrics/characteristics and VAP stats from APs 302, supervisory device 304 may occasionally increase or otherwise adjust the APs in the VAP mapping. For example, as shown in FIG. 5A, supervisory device 304 may include AP 302e in the VAP mapping for purposes of data collection after formation of the VAP (e.g., via an instruction 312, even though AP 302e was not included in the original VAP mapping. This allows AP 302e to collect and report information that would not otherwise be possible using the original APs of the VAP. For example, by changing the set of APs, the learning machine can change the TDOA listeners and optimize the distance estimation, e.g., by adding APs while doing a measure, or triangulating between different sets of APs. Such collected information 502 may be reported to supervisory device 304, either on a push or pull basis. After the data collection, supervisory device 304 may opt to revert the VAP mapping back to its previous membership or make further adjustments to the AP memberships, accordingly.

As shown in FIG. 5B, supervisory device 304 may also convey data regarding the performance of the VAP (e.g., the objective function, etc.) to a user interface 504 for review by a user. In some embodiments, the learning machine may also use reinforcement learning to adjust its model for node 306 and make changes to the VAP mapping, accordingly. In such a case, the user of interface 504 (e.g., an admin device, etc.) may provide feedback 506 to the learning machine about the VAP efficiency, which is then used by the LM to adjust the strategy adopted to compute the VAP mapping.

Based on the captured network characteristics from the APs, the performance statistics for the VAP itself, and/or user feedback, the machine learning process may adjust the VAP by changing the APs in the VAP mapping. For example, as shown in FIG. 5C, assume that node 506 has move to a new physical location and is now in closer proximity to APs 302e and 302g. In such a case, supervisory device 504 may select a new set of APs 302 for the VAP of node 306 and send out corresponding instructions to the APs. Notably, as shown, supervisory device 304 may select a new set of APs for the VAP of node 306 that includes APs 302e, 302f, and 302g, with 302g now designated as the primary AP.

Thus, the generated VAP may add spatial diversity to any CSMA/CA LLN, in a manner somewhat akin to that of the LoRa model. However, in contrast to the techniques herein, LoRa uses different MAC operations and does not support the faster speeds of the components (e.g., PHY) used in today's IoT network devices. Additionally, LoRa does not support the association process, the use of identities (e.g., PAN-ID or SSID), and the automatic repeat request (ARQ) process for acknowledgement and retry, which are supported using the techniques herein. Further, LoRa does not support multicast communications, either.

Figure 6:
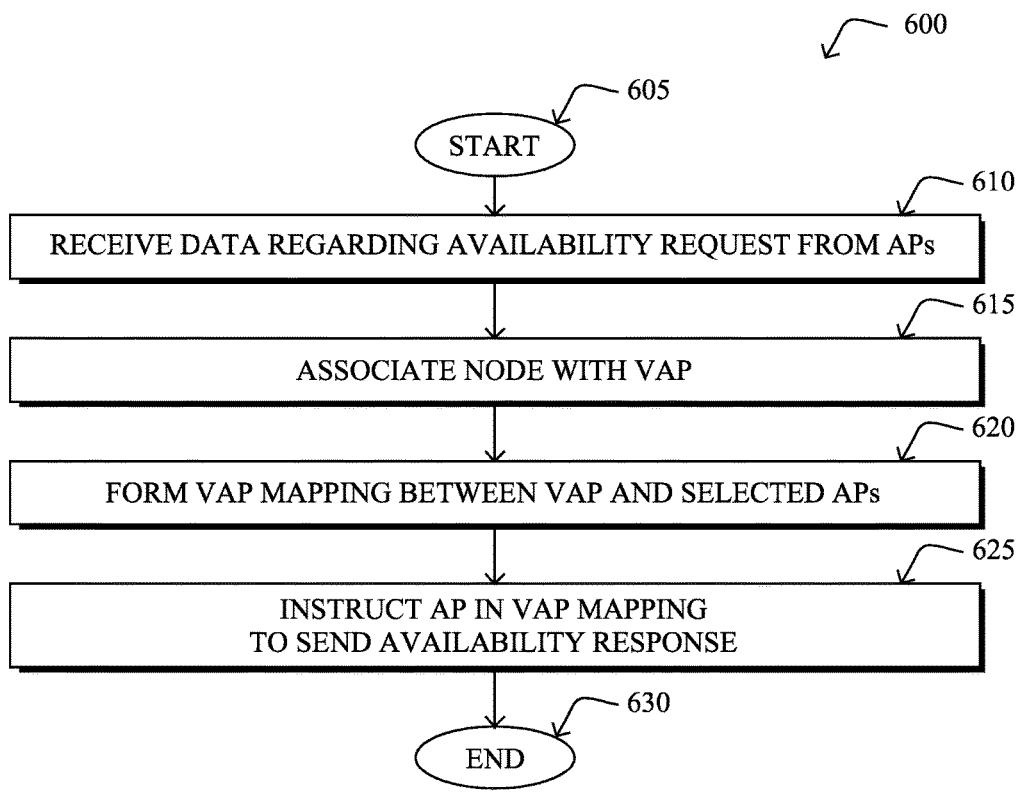
FIG. 6 illustrates an example simplified procedure for forming a VAP.

FIG. 6 illustrates an example simplified procedure for forming a VAP, in accordance with one or more embodiments described herein. For example, a non-generic, specifically configured device (e.g., device 200) may perform procedure 600 by executing stored instructions (e.g., process 248). The procedure 600 may start at step 605 and continue to step 610, where, as described in greater detail above, a supervisory device in a network receives data regarding a network availability request broadcast by a node seeking to access the network and received by the access points (APs) in the plurality. In some cases, the data may include one or more characteristics/metrics regarding the broadcast, such as a link quality indicator (LQI), a signal to noise ratio (SNR), or received signal strength indicator (RSSI), or the like, from each of the receiving APs.

At step 615, as detailed above, the supervisory device may uniquely associate the node with a virtual access point (VAP). In general, the VAP may comprise a logical collection of physical APs in the network selected based in part on the data received in step 610. In some embodiments, the supervisory device may also assign a unique network identifier to the VAP, such as a unique SSID or PAN-ID to be used by the node when accessing the network.

At step 620, the supervisory device may form a VAP mapping between VAP for the node and a set of the AP in the plurality selected based on the received data regarding the network availability request broadcast by the node, as described in greater detail above. For example, the supervisory device may base the AP selection for the VAP mapping on the characteristic of the received network access request (e.g., in terms of signal strength, etc.), a location of the node, an objective function associated with the node type or expected traffic from the node, or other such factors. In some embodiments, the supervisory device may also apply machine learning, to select and/or adjust the VAP mapping, as needed. In addition to mapping APs to the VAP, the device may further designate one of the selected APs as the primary AP for the node.

At step 625, as detailed above, the supervisory device may instruct the primary AP to send a network availability response to the node that includes information for the VAP. For example, such a response may indicate the SSID, PAN-ID, or other identifier associated with the VAP. In turn, the node uses the information for the VAP to access the network via the set of APs in the VAP mapping. However, from the perspective of the node, the node may not have any direct knowledge of the existence of the VAP. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the formation of a VAP that is per endpoint node, centrally controlled by learning machines operating in conjunction with a supervisory device, and logical and distributed over multiple physical APs. The VAP looks like a normal AP from the perspective of the end node. In various embodiments, this may be achieved by the supervisory device providing all Layer 2 information to the node (e.g., via one or more of the APs of the VAP). This means that a virtual L2 address will be assigned to the VAP to source packets to the device and that cryptographic information will be synchronized between the APs in the VAP mapping, e.g., over the Ethernet backbone via a multicast group dedicated to the VAP or the like. This may also leverage the new protocol described afterwards, e.g., using the supervisory device as a reflector.

While the perspective of the endpoint node does not change, the actual AP in the VAP that interacts with the node may change on a per packet and/or flow basis. For example, when an STA/node sends a packet, there may be multiple APs around that catch the packet, and not necessarily the same for each packet, due to the properties of radio propagation. By using multiple APs as one VAP, the chances of successful exchanges are increased, which notably allows for better determinism. The techniques described herein, thus, may reduce the damaging effects of frame loss, such as increased latency on the flow that is being retried, but also on the other flows competing to the media, on operational technology (OT) traffic.

Note that some protocols on Wi-Fi networking refer to a "virtual access point" as many different things. For example, hosting several logical APs in one physical AP may be referred to as a "virtual access point", while turning a PC into an AP may also be referred to as a "virtual access point". The VAPs in this present disclosure should not be confused with the shared terminology, and is completely different in that one VAP herein is distributed over multiple physical APs, and there can be one VAP per STA.

Furthermore, the techniques herein provide a new protocol of messages that may be used between the supervisory device (e.g., the controller), the APs of the VAP, and the user. For example, VAP commands may be sent by the supervisory device to one or more of the APs of the VAP in order to gather metrics of interest, report the VAP group membership, etc. Also, VAP metrics may be sent by the APs to the supervisory device and used by the objective function to compute an initial or updated VAP (e.g. signal/noise ratio, signal strength, etc.). In addition, a VAP statistics report may be provided by one or more of the APs to the supervisory device, which may be used to evaluate VAP efficiency or, further, may be used to gather statistical data used by the controller to determine the "efficiency" of the VAP group, useful for consistently adjusting the VAP according to an objective function. Also, learning machine statistics may be sent by the supervisory device to the user to report objective function efficiency results. As a result, using machine learning reinforcement learning, the user may provide feedback to the learning machine about the VAP efficiency, which may then be used by the learning machine to adjust the strategy adopted to compute VAP groups.

While there have been shown and described illustrative embodiments that provide techniques related to VAP formation, it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, such as Wi-Fi, 802.15.4, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising
   receiving, at a supervisory device in a network and from a plurality of access points in the network, data regarding a network availability request broadcast by a node seeking to access the network and received by the access points in the plurality;
   uniquely associating, by the supervisory device, the node with a virtual access point for the node;
   forming, by the supervisory device, a virtual access point mapping between the virtual access point for the node and a set of the access points in the plurality selected based on the received data regarding the network availability request broadcast by the node, wherein one of the access points in the virtual access point mapping is designated as a primary access point for the node;
   instructing, by the supervisory device, the primary access point to send a network availability response to the node that includes information for the virtual access point, wherein the node uses the information for the virtual access point to access the network via the set of access points in the virtual access point mapping;
   changing, by the supervisory device, the set of access points in the virtual access point mapping using a machine learning model to optimize the chance of reception of a packet communicated between the node and the set of access points; and
   receiving, at the supervisory device, one or more collected network metrics for the node from the set of access points in the virtual access point mapping, wherein the machine learning model is further configured to change the set of access points in the mapping to optimize an objective function based on the received one or more network metrics for the node.

2. The method as in claim 1, wherein uniquely associating the node with a virtual access point for the node comprises:
   associating, by the supervisory device, a media access control (MAC) address of the node with a unique service set identifier (SSID) or unique personal area network identifier (PAN-ID) associated with the virtual access point, wherein the network availability response includes the SSID or PAN-ID associated with the virtual access point.

3. The method as in claim 1, wherein the data regarding the network availability request comprises, for each of access points in the plurality, one or more of: a link quality indicator (LQI), a signal to noise ratio (SNR), or received signal strength indicator (RSSI).

4. The method as in claim 1, wherein the objective function seeks to optimize the one or more network metrics based on a node type associated with the node.

5. The method as in claim 1, wherein the set of access points in the mapping are changed to increase the set of access points in the virtual access point mapping during collection of the one or more network metrics by the set of access points in the mapping.

6. The method as in claim 1, further comprising:
instructing, by the supervisory device, at least one of the non-primary access points in the virtual access point mapping to retransmit a packet originally sent by the primary access point to the node and not acknowledged by the node.

7. An apparatus comprising:
one or more network interfaces to communicate with a network;
a processor coupled to the network interfaces and configured to execute one or more processes; and
a memory configured to store a process executable by the processor, the process when executed configured to:
receive, from a plurality of access points in the network, data regarding a network availability request broadcast by a node seeking to access the network and received by the access points in the plurality;
uniquely associate the node with a virtual access point for the node;
form a virtual access point mapping between the virtual access point for the node and a set of the access points in the plurality selected based on the received data regarding the network availability request broadcast by the node, wherein one of the access points in the virtual access point mapping is designated as a primary access point for the node;
instruct the primary access point to send a network availability response to the node that includes information for the virtual access point, wherein the node uses the information for the virtual access point to access the network via the set of access points in the virtual access point mapping;
change the set of access points in the virtual access point mapping using a machine learning model to optimize the chance of reception of a packet communicated between the node and the set of access points; and
receive one or more collected network metrics for the node from the set of access points in the virtual access point mapping, wherein the machine learning model is further configured to change the set of access points in the mapping to optimize an objective function based on the received one or more network metrics for the node.

8. The apparatus as in claim 7, wherein the apparatus uniquely associates the node with a virtual access point for the node by:
associating, by the supervisory device, a media access control (MAC) address of the node with a unique service set identifier (SSID) or unique personal area network identifier (PAN-ID) associated with the virtual access point, wherein the network availability response includes the SSID or PAN-ID associated with the virtual access point.

9. The apparatus as in claim 7, wherein the data regarding the network availability request comprises, for each of access points in the plurality, one or more of: a link quality indicator (LQI), a signal to noise ratio (SNR), or received signal strength indicator (RSSI).

10. The apparatus as in claim 7, wherein the objective function seeks to optimize the one or more network metrics based on a node type associated with the node.

11. The apparatus as in claim 7, wherein the set of access points in the mapping are changed to increase the set of access points in the virtual access point mapping during collection of the one or more network metrics by the set of access points in the mapping.

12. The apparatus as in claim 7, wherein the process when executes is further configured to:
instruct at least one of the non-primary access points in the virtual access point mapping to retransmit a packet originally sent by the primary access point to the node and not acknowledged by the node.

13. A tangible, non-transitory, computer-readable medium storing program instructions that, when executed by a supervisory device in a network to perform a process comprising:
receiving, at the supervisory device and from a plurality of access points in the network, data regarding a network availability request broadcast by a node seeking to access the network and received by the access points in the plurality;
uniquely associating, by the supervisory device, the node with a virtual access point for the node;
forming, by the supervisory device, a virtual access point mapping between the virtual access point for the node and a set of the access points in the plurality selected based on the received data regarding the network availability request broadcast by the node, wherein one of the access points in the virtual access point mapping is designated as a primary access point for the node;
instructing, by the supervisory device, the primary access point to send a network availability response to the node that includes information for the virtual access point, wherein the node uses the information for the virtual access point to access the network via the set of access points in the virtual access point mapping;
changing the set of access points in the virtual access point mapping using a machine learning model to optimize the chance of reception of a packet communicated between the node and the set of access points; and
receiving one or more collected network metrics for the node from the set of access points in the virtual access point mapping, wherein the machine learning model is further configured to change the set of access points in the mapping to optimize an objective function based on the received one or more network metrics for the node.

14. The tangible, non-transitory, computer-readable medium as in claim 13, wherein uniquely associating the node with a virtual access point for the node comprises:
associating, by the supervisory device, a media access control (MAC) address of the node with a unique service set identifier (SSID) or unique personal area network identifier (PAN-ID) associated with the virtual access point, wherein the network availability response includes the SSID or PAN-ID associated with the virtual access point.

15. The tangible, non-transitory, computer-readable medium as in claim 13, wherein the data regarding the network availability request comprises, for each of access points in the plurality, one or more of: a link quality indicator (LQI), a signal to noise ratio (SNR), or received signal strength indicator (RSSI).

16. The tangible, non-transitory, computer-readable medium as in claim 13, wherein the objective function seeks to optimize the one or more network metrics based on a node type associated with the node.

17. The tangible, non-transitory, computer-readable medium as in claim 13, wherein the set of access points in the mapping are changed to increase the set of access points in the virtual access point mapping during collection of the one or more network metrics by the set of access points in the mapping.

18. The tangible, non-transitory, computer-readable medium as in claim 13, instructing, by the supervisory device, at least one of the non-primary access points in the virtual access point mapping to retransmit a packet originally sent by the primary access point to the node and not acknowledged by the node.

\* \* \* \* \*